United States Patent
Ueda et al.

(10) Patent No.: US 6,491,228 B1
(45) Date of Patent: Dec. 10, 2002

(54) IC CARD

(75) Inventors: Takashi Ueda, Kyoto (JP); Yoshihiro Ikefuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/341,117

(22) PCT Filed: Aug. 12, 1997

(86) PCT No.: PCT/JP97/04506

§ 371 (c)(1),
(2), (4) Date: Jul. 7, 1999

(87) PCT Pub. No.: WO98/30972

PCT Pub. Date: Jul. 16, 1998

(30) Foreign Application Priority Data

Jan. 14, 1997 (JP) .............................. 9-004741

(51) Int. Cl.⁷ .............................................. G06K 19/06
(52) U.S. Cl. ...................................... 235/492; 235/487
(58) Field of Search ................................. 235/492, 487

(56) References Cited

U.S. PATENT DOCUMENTS

| | | | | |
|---|---|---|---|---|
| 4,200,227 A | * | 4/1980 | Lemelson | 235/382 |
| 4,532,419 A | * | 7/1985 | Takeda | 235/492 |
| 4,563,575 A | * | 1/1986 | Hoppe et al. | 235/487 |
| 4,755,661 A | * | 7/1988 | Ruebsam | 235/492 |
| 4,810,864 A | * | 3/1989 | Takahashi | 235/487 |
| 5,005,106 A | * | 4/1991 | Kiku | 361/424 |
| 5,068,521 A | * | 11/1991 | Yamaguchi | 235/492 |
| 5,198,647 A | * | 3/1993 | Mizuta | 235/449 |
| 5,473,145 A | * | 12/1995 | Wallerstorfer et al. | 235/382 |
| 5,475,606 A | * | 12/1995 | Muyshondt et al. | 364/489 |
| 5,529,503 A | * | 6/1996 | Kerklann | 439/76.1 |
| 5,541,452 A | * | 7/1996 | Onoda et al. | 257/723 |
| 5,546,278 A | * | 8/1996 | Bethurum | 361/737 |
| 5,664,157 A | * | 9/1997 | Takahira et al. | 395/500 |
| 5,671,123 A | * | 9/1997 | Omori et al. | 361/737 |
| 6,012,641 A | * | 1/2000 | Watada | 235/488 |

FOREIGN PATENT DOCUMENTS

| | | | | |
|---|---|---|---|---|
| JP | 57-201699 | | 12/1982 | |
| JP | 62-94064 | | 6/1987 | |
| JP | 63-16176 | | 2/1988 | |
| JP | 4-112096 | | 4/1992 | |
| JP | 404112096 A | * | 4/1992 | 283/82 |
| JP | 4-336299 | | 11/1992 | |
| JP | 6-183189 | * | 7/1994 | |

* cited by examiner

Primary Examiner—Karl D. Frech
(74) Attorney, Agent, or Firm—Arent Fox Kintner Plotkin & Kahn PLLC

(57) ABSTRACT

An IC card capable of effectively preventing electrostatic breakdown of an IC even when it is charged with static electricity is provided. In the IC card, a discharging member (2 to 5) of a non-insulator is provided at a portion of IC card (1). Thus, even when IC card (1) is charged with static electricity, discharge current of static electricity is discharged through discharging member (2 to 5), so that the discharge current is effectively prevented form flowing into IC (101). As a result, even when IC card (1) is charged with static electricity, electrostatic breakdown of IC (101) is prevented, whereby breakdown or malfunction of entire IC card (1) is avoided.

4 Claims, 3 Drawing Sheets

IC CARD

TECHNICAL FIELD

The present invention relates to IC cards, and more specifically to an IC card including an integrated circuit (IC) for performing data transmission.

BACKGROUND ART

Some IC cards perform data transmission with a terminal electrically connected to a control portion, while others perform data transmission in a non-contact state. In the non-contact type IC card, power is obtained form a radio wave from an antenna for transmission of information stored in the internal non-volatile memory. Such non-contact type IC card is used for a gate of the ski lift, gate at the station and sorting of parcels and the like.

FIG. 6 is a schematic diagram showing a structure of a conventional non-contact type IC card. As shown in FIG. 6, a conventional non-contact type IC card 1 includes an IC 101 and an antenna 102 connected to IC 101. IC 101 and antenna 102 are contained in IC card 1. IC card 1 is generally formed of an insulating material such as polyester or vinyl chloride. The non-contact type IC card as shown in FIG. 6 is generally referred to as an and antenna 102 are both conductive and have lower resistance as compared with IC card 1. Thus, when static electricity or the like is externally transferred to IC card 1, discharge current of the static electricity may flow into IC 101 and antenna 102. If the discharge current of static electricity flows into IC 101 and antenna 102, electrostatic breakdown of IC 101 is caused. As a result, breakdown and malfunction of the entire portion of IC card 1 are disadvantageously caused.

More specifically, as shown in FIG. 7, for example, assume that a portion A of IC card 1 is held by a person charged with static electricity when a portion B is grounded. In this case, discharge current of static electricity first flows into that portion of insulating material at the surface of IC card 1 which is positioned at A, and then into IC 101 and antenna 102 of IC card 1 for being discharged from portion B. This may lead to a problem associated with breakdown of the entire card including IC 101 and antenna 102. Such problem also arises, for example, when a ground rod is brought closer to the electrically charged card.

The present invention is made to solve the aforementioned problem, and it is an object to provide an IC card capable of effectively preventing electrostatic breakdown of an IC even when the IC card is charged with static electricity.

DISCLOSURE OF INVENTION

An IC card according to the present invention includes an integrated circuit (IC) and is characterized in that a portion thereof is provided with a discharging member of a non-insulator. Such provision of the discharging member of the non-insulator enables discharge current of static electricity to be discharged through the discharging member, thereby effectively preventing the discharge current from flowing into the integrated circuit even when the IC card is charged with static electricity. Thus, electrostatic breakdown of the integrated circuit is prevented even when the IC card is charged with static electricity, so that breakdown or malfunction of the entire IC card is prevented. In the above structure, the discharging member may be provided in a prescribed region other than that where the integrated circuit of the IC card is arranged. In the above structure, the discharging member may include a metal layer formed on an inner surface of a through hole in the IC card. In the above structure, the discharging member may have a thickness which is at least greater than those of the antenna and integrated circuit (IC). In the above structure, the discharging member may be provided at a periphery of the IC card. In the above structure, the discharging member may be provided on the surface of the IC card in a mesh like manner. More preferably, in the above structure, the discharging member is provided to surround the integrated circuit. Such provision of the discharging member to surround the integrated circuit also enables the static electricity to be discharged through the discharging member surrounding the integrated circuit when the IC card is charged with the static electricity, so that the discharge current is prevented from flowing into the integrated circuit. In other words, the discharging member functions as a shield for protecting the integrated circuit. More preferably, in any of the above mentioned structures, the non-insulator forming the discharging member may be any of conductive rubber, conductive resin, conductive coating and metal.

BEST MODE FOR CARRYING OUT THE INVENTION

First Embodiment

Figure 1:
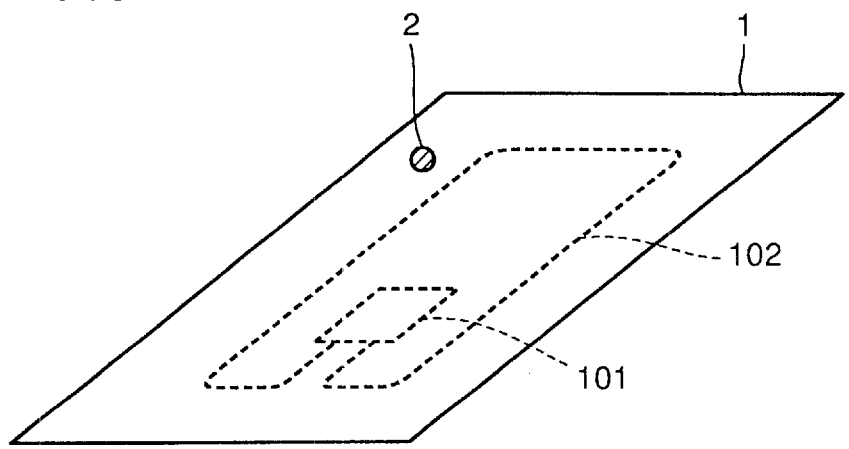
FIG. 1 is a schematic diagram showing a non-contact type IC card according to a first embodiment of the present invention.

FIG. 1 is a schematic diagram showing a non-contact type IC card according to a first embodiment of the present invention. As shown in FIG. 1, in the first embodiment, an IC card 1 includes an IC 101 and an antenna 102 as in the conventional IC card. In the first embodiment, a discharging member 2 of a non-insulator is provided in a prescribed region of IC card 1 including an insulating material such as polyester or vinyl chloride. The non-insulator in the present invention refers to metal such as copper, conductive rubber, conductive resin, conductive coating or the like.

Discharging member 2 according to the first embodiment may be formed for example by providing a through hole as a through hole in the printed circuit board and forming metal such as copper on the inner surface of the through hole. When the through hole is not formed, it is desirable that the discharging member 2 has a thickness which is at least greater than those of antenna 102 and IC 101. More specifically, when the IC card has a thickness of 0.76 mm, antenna 102 has a thickness of 0.2 mm to 0.3 mm and IC 101 has a thickness of 0.3 mm, discharging member 2 preferably has a thickness of at least 0.3 mm. Thus, as the thickness of discharging member 2 is greater than those of antenna 102 and IC 101, the discharge current of static electricity readily flows into discharging member 2 when IC card 1 is charged with static electricity.

Although discharging member 2 is provided only at one portion in FIG. 1, such discharging member 2 may be provided at several portions. If discharging members 2 are provided at several portions, the discharge current of static electricity more readily flows into discharging member 2, so that the discharge current is more effectively prevented from flowing into IC 101 and antenna 102.

As described above, in the embodiment shown in FIG. 1, as discharging member 2 of a non-insulator is provided in a region other than that where IC 101 and antenna 102 of IC card 1 including insulating material is provided, the discharge current of static electricity more readily flows into discharging member 2 when IC card 1 is charged with static electricity. As a result, the discharge current is effectively prevented from flowing into IC 101 and antenna 102. Accordingly, electrostatic breakdown of IC 101 is prevented even when IC card 1 is charged with static electricity, so that the problem associated with the breakdown or malfunction of the entire IC card 1 is avoided.

Second Embodiment

Figure 2:
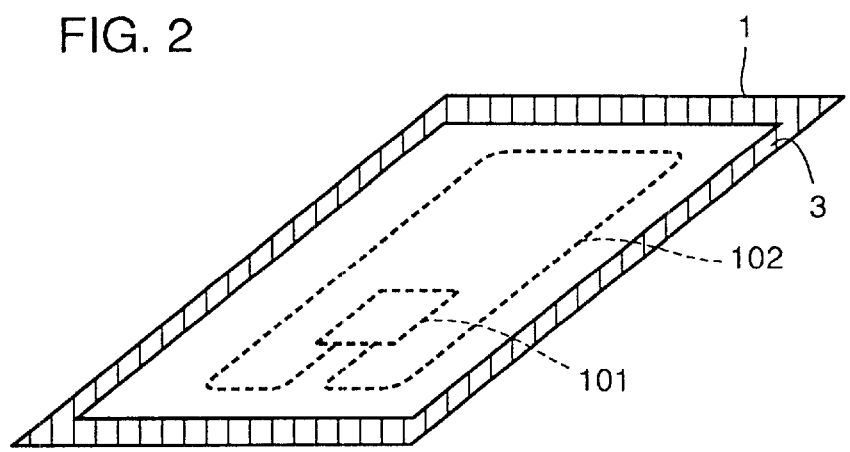
FIG. 2 is a schematic diagram showing a non-contact type IC card according to a second embodiment of the present invention.

FIG. 2 is a schematic diagram showing a non-contact type IC card according to a second embodiment of the present invention. Referring to FIG. 2, in the second embodiment, a discharging member 3 of a non-insulator is provided at a periphery of IC card 1. Discharging member 3 may be for example in a coil like form. As in the above described first embodiment, such provision of discharging member 3 at the periphery of IC card 1 also enables discharge current of static electricity to flow into discharging member 3 when IC card 1 is charged with static electricity, whereby the discharge current is effectively prevented from flowing into IC 101 and antenna 102. Thus, the problem associated with electrostatic breakdown of IC 101 when IC card 1 is charged with static electricity is avoided.

Third Embodiment

Figure 3:
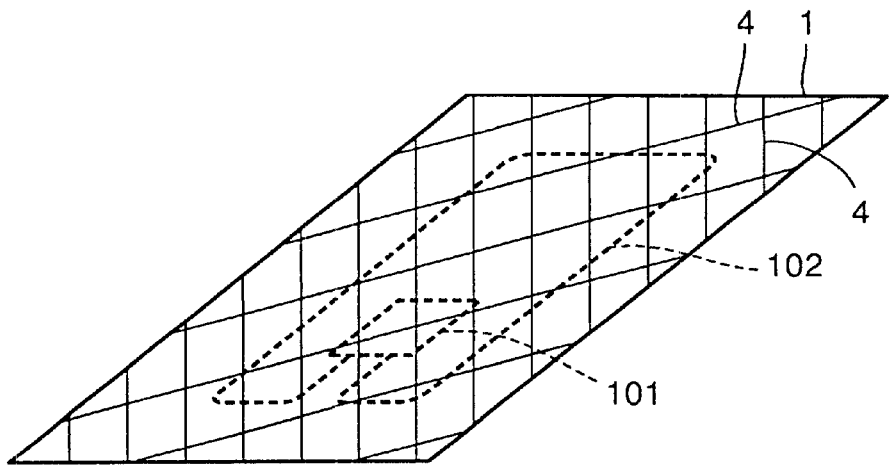
FIG. 3 is a schematic diagram showing a non-contact type IC card according to a third embodiment of the present invention.

FIG. 3 is a schematic diagram showing a non-contact type IC card according to a third embodiment of the present invention. Referring to FIG. 3, in the third embodiment, a mesh (net) like discharging member 4 of a non-insulator is arranged on front and back surfaces and ends of IC card 1 including an insulating material. Such mesh like discharging member 4 can readily be formed, for example, by providing a conductive pattern with printing. As in the above described first and second embodiments, the provision of such mesh like discharging member 4 of the non-insulator also enables the discharge current of static electricity to flow into the mesh like discharging member 4 when IC card 1 is charged with static electricity, so that the discharge current is effectively prevented from flowing into IC 101 and antenna 102. Thus, when IC card 1 is charged with static electricity, electrostatic breakdown of IC 101 is prevented. As a result, the problem associated with malfunction or the like of the IC card is effectively avoided.

Fourth Embodiment

Figure 4:
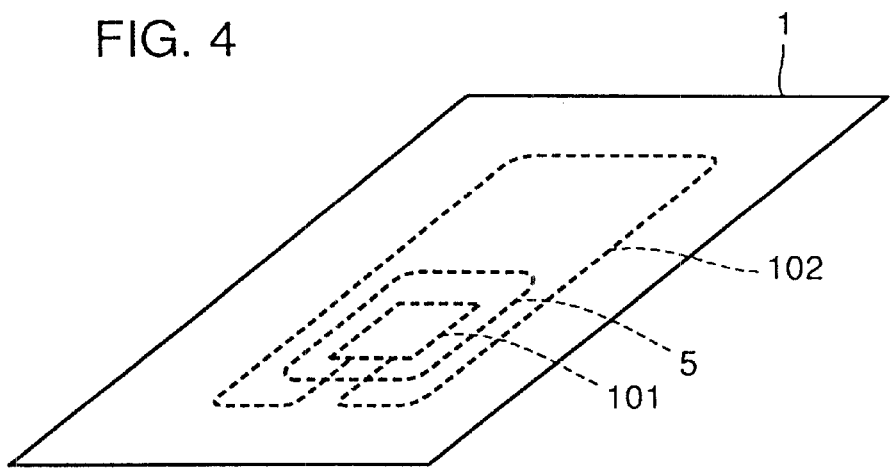
FIG. 4 is a schematic diagram showing a non-contact type IC card according to a fourth embodiment of the present invention.
Figure 5:
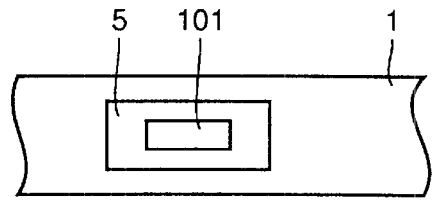
FIG. 5 is a partial cross section showing the IC card according to the fourth embodiment shown in FIG. 4.
Figure 6:
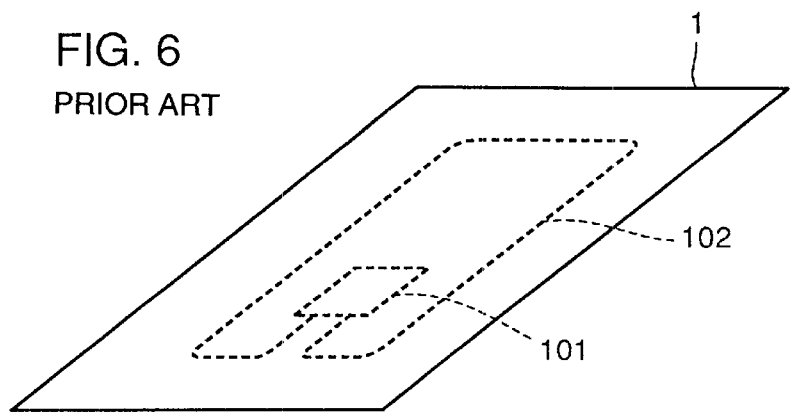
FIG. 6 is a schematic diagram showing a conventional non-contact type IC card.
Figure 7:
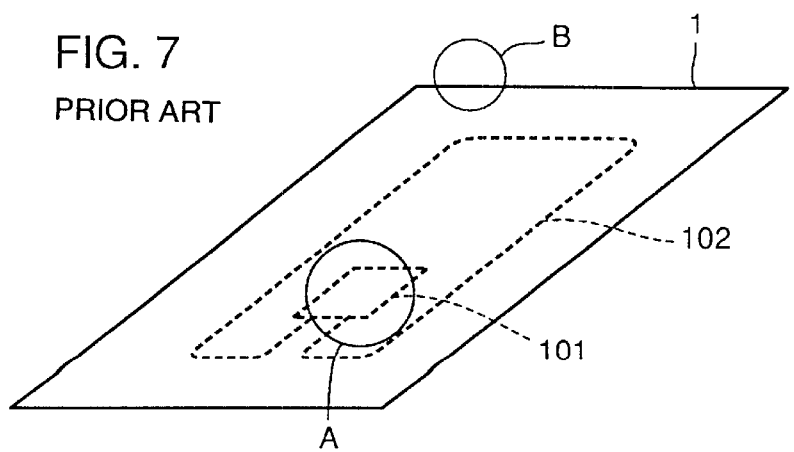
FIG. 7 is a schematic diagram shown in conjunction with a problem of the conventional non-contact type IC card.

FIG. 4 is a schematic diagram showing a non-contact type IC card according to a fourth embodiment of the present invention, and FIG. 5 is a partial cross section of the card shown in FIG. 4. Referring to FIGS. 4 and 5, in the fourth embodiment, a discharging member 5 of a non-insulator is provided to surround IC 101 except for a terminal portion. In other words, discharging member 5 is provided to shield IC 101. As in the above described first to third embodiments, the provision of discharging member 5 of the non-insulator to shield IC 101 also enables the discharge current of static electricity to flow into discharging member 5 when IC card 1 is charged with static electricity, so that discharge current 5 is effectively prevented from flowing into IC 101. Thus, electrostatic breakdown of IC 101 is effectively prevented when IC card 1 is charged with static electricity. As a result, malfunction or the like of IC card 1 is avoided. Referring to FIG. 5, it is noted that when the thickness of IC card 1 is 0.76 mm and the thickness of IC 101 is 0.3 mm, the thickness of discharging member 5 is preferably about 0.5 mm. As in the case of the first embodiment, metal such as copper, conductive rubber, conductive resin or conductive coating may be used for the non-insulator of discharging member 5.

It is noted that although the non-contact type IC card has been described in each of the above first to fourth embodiments, the present invention is not limited to this and may be applied to a contact type IC card. In addition, the term "IC card" used in the present invention may include a card in a disk like shape, module like configuration or the like.

As in the foregoing, according to the present invention, electrostatic breakdown of the IC is effectively prevented even when the IC card is charged with static electricity, so that breakdown or malfunction of the entire IC card can be avoided.

What is claimed is:

1. A non-contact IC card including an integrated circuit (101) and an antenna (102) connected thereto, including
a discharging member (2, 3, 4, 5) of a non-insulator at a portion thereof, said non-insulator forming said discharging member (2, 3, 4, 5) being any of conductive rubber, conductive resin, conductive coating and metal;
wherein said discharging member (2) is provided only in a prescribed region other than that where said integrated circuit (101) of said IC card is provided.

2. The IC card according to claim 1, wherein said discharging member (2) has a thickness at least greater than thicknesses of an antenna (102) and said integrated circuit (101).

3. The IC card according to claim 1, wherein said discharging member (3) is arranged at a periphery of said IC card.

4. The IC card according to claim 1, wherein said discharging member (5) is arranged in a mesh like manner on a surface of said IC card.

* * * * *